United States Patent [19]
Hamamoto et al.

[11] Patent Number: 5,223,067
[45] Date of Patent: Jun. 29, 1993

[54] METHOD OF FABRICATING AIRCRAFT FUSELAGE STRUCTURE

[75] Inventors: Kenji Hamamoto; Kazuaki Amaoka, both of Tokyo; Naoya Takizawa, Utsunomiya; Masanori Hosoi, Shimotsuga, all of Japan

[73] Assignee: Fuji Jukogyo Kabushiki Kaisha, Tokyo, Japan

[21] Appl. No.: 913,904

[22] Filed: Jul. 16, 1992

Related U.S. Application Data

[62] Division of Ser. No. 659,252, Feb. 22, 1991, Pat. No. 5,170,967.

[30] Foreign Application Priority Data

Feb. 28, 1990 [JP] Japan .................... 2-48132

[51] Int. Cl.$^5$ ............................ B65H 81/00
[52] U.S. Cl. .................... 156/173; 156/169; 156/189; 156/245; 244/125; 244/119
[58] Field of Search ............. 156/169, 172, 173, 174, 156/184, 189, 245, 323; 244/125, 119

[56] References Cited

U.S. PATENT DOCUMENTS

| | | | |
|---|---|---|---|
| 2,749,266 | 6/1956 | Eldred | 156/173 |
| 3,071,217 | 1/1963 | Gould . | |
| 3,978,256 | 8/1976 | James . | |
| 4,086,378 | 4/1978 | Kam et al. . | |
| 4,230,293 | 10/1980 | Hamm et al. . | |
| 4,330,349 | 5/1982 | Swift et al. | 156/174 |
| 4,512,836 | 4/1985 | Tucci | 156/174 |
| 4,715,560 | 12/1987 | Loyek . | |
| 4,786,343 | 1/1988 | Hertzberg . | |
| 4,822,272 | 4/1989 | Yanase et al. | 156/173 |

FOREIGN PATENT DOCUMENTS

| | | |
|---|---|---|
| 620518 | 4/1927 | France . |
| 1114301 | 4/1956 | France . |
| 57-34944 | 2/1982 | Japan . |
| 61-169394 | 7/1986 | Japan . |
| 62-19440 | 1/1987 | Japan . |
| 2224000 | 4/1990 | United Kingdom . |

*Primary Examiner*—Jeff H. Aftergut
*Assistant Examiner*—Robert W. Robey
*Attorney, Agent, or Firm*—Beveridge, DeGrandi, Weilacher & Young

[57] ABSTRACT

An aircraft fuselage structure is fabricated by the following steps. A plurality of ring-shaped members are first prepared, each member being provided around the outer peripheral surface thereof at positions spaced apart in the circumferential direction thereof with a plurality of recesses. Elongated plate members are provided which have respective convex parts corresponding to the recesses, to form stringers. The ring-shaped members are then arranged at a coaxially spaced-apart paralleled disposition, and thereafter a laminating jig is inserted into the coaxially arranged ring-shaped members with a silicone bag interposed therebetween, the silicone bag having an open opposite end. The ring-shaped members are placed in annular recesses provided in the laminating jig and in correspondingly formed annular recesses provided in the bag. Then stringers are placed on the ring-shaped members with the convexed parts fitted in the recesses of the ring-shaped members, so that a framework of the ring-shaped members and the stringers are formed. The framework is thereafter fitted on a winding jig, and a fiber-reinforced prepreg of tape form is wound around the framework. The entire assembly is subjected to curing and bagging processes. The jigs and bag are removed finally.

6 Claims, 3 Drawing Sheets

METHOD OF FABRICATING AIRCRAFT FUSELAGE STRUCTURE

This is a division of application Ser. No. 07/659,252 filed Feb. 22, 1991 now U.S. Pat. No. 5,170,967.

BACKGROUND OF THE INVENTION

The present invention relates to an aircraft structure, and more particularly to an aircraft fuselage structure made of fiber-reinforced resin. The invention also relates to a method of fabricating the fuselage structure.

Various techniques or methods for fabricating aircraft fuselage structures by using fiber-reinforced resins have been proposed in the prior art.

In one such method, a framework comprising longitudinal stringers and reinforcing rings is subassembled beforehand in a separate process. An inner mold is placed in this framework. On the other surface of the inner mold on which the framework is fitted, exposed fibers and outer sheathing fibers are alternately laminated with a resin interposed therebetween. A hollow cylindrical structure is thus formed as disclosed in Japanese Patent Application Laid-Open Publication No. 61-169394.

According to another method, reinforcing fibers impregnated with adhesive are prepared. The reinforcing fibers are laminated by stretching on a convex molding surface of a split male mold half. The adhesive is then set or hardened thereby to form a fiber laminated structure of the shape of a split hollow cylinder. The thus obtained structure is then interwoven. Thereafter the adhesive thereof is removed. The resulting fiber laminated structure is then placed in a split female mold half and is impregnated with a resin. The resin is then set thereby to fabricate an outer sheathing of the shape of a split hollow cylinder half. Two of the outer sheathings are joined together in a manner such that the exposed reinforcing fibers become intertwined. The fiber-intertwined parts thus formed are impregnated with a resin. The resin is set, whereupon an outer skin structure is obtained. The method is disclosed in Japanese Patent Application Laid-Open Publication No. 62-19440.

According to a known method of mutually connecting together members constituting a fuselage, fibers orientated in two mutually perpendicular directions are interwoven to form a criss-crossing fabric. The criss-crossing fabric is used at the connections and impregnated with a resin. By setting the resin, strong connections are produced. The method is disclosed in Japanese Patent Application Laid-Open Publication No. 57-34944.

The methods known in the prior art, however, have been accompanied by problems as described below.

In the first method described above, it is necessary to fabricate beforehand longitudinal stringers and reinforcing rings to become strength members for a fuselage. This lowers production efficiency. Furthermore, in order to connect the rings and the outer skin, the exposed fibers of the ring outer surfaces and the outer skin fibers must be alternately laminated with a resin interposed therebetween. The work efficiency is therefore poor. Also the quality of the product formed by the method is not fully satisfactory.

According to the second method described above, during the forming of the outer skin structure of split hollow cylindrical half, lamination is first carried out together with the adhesive. Thereafter the adhesive is removed. Then the skin must be newly impregnated with a resin. These steps require much laborious work.

In the third method described above, in order to mutually connect together members constituting a fuselage, other members are necessary. This results in additional weight. Accordingly, the method is not suitable.

SUMMARY OF THE INVENTION

The present invention has been made in view of the above described circumstances of the prior art. It is an object of the present invention to provide an aircraft fuselage structure of high strength and a method of fabricating the same.

As is known, a prepreg is a material prepared by impregnating a reinforced fiber material (such as glass fiber) with a thermosetting resin which is set to a degree slightly beyond the B stage. A prepreg can be preserved until it is necessary for forming an article or for lamination work.

According to the present invention in one aspect thereof, there is provided an aircraft fuselage structure comprising a plurality of ring-shaped members of a fiber-reinforced laminated material, disposed coaxially and spaced axially from each other with substantially parallel orientation relative to each other, a plurality of stringers of a fiber-reinforced laminated material, said stringers extending axially of the ring-shaped members in parallel spaced disposition circumferentially of the ring-shaped members to fixedly connect the ring-shaped members with each other so as to form a framework, and an outer skin of a prepreg material secured to an outer surface of the framework to cover the framework: an improvement of the fuselage structure being in that said ring-shaped members are provided each with a plurality of recesses formed around the outer peripheral surface thereof at positions spaced in the circumferential direction thereof, said stringers have a shape of plate members with respective convex parts corresponding in shape to said recesses of the ring-shaped members, said convex parts being fitted in said recesses to connect together said ring-shaped members to form a framework of the ring-shaped members and the stringers, and a fiber-reinforced prepreg of tape form is provided, said prepreg being wound around the outer surface of the framework and set by a curing process to integrally form said outer sheathing of the fuselage structure.

According to the present invention, in another aspect thereof, there is provided a method of fabricating an aircraft fuselage structure, comprising the steps of: preparing a plurality of ring-shaped members of a fiber reinforced laminated material, each provided with a plurality of recesses around the outer peripheral surface thereof at positions spaced apart in the circumferential direction thereof; preparing a plurality of stringers of a fiber reinforced laminated material, each consisting of a plate member and a convex part on the plate member, said convex part corresponding in shape to each of said recesses; arranging said ring-shaped members coaxially at spaced apart dispositions with substantially parallel orientation relative to each other and with the recesses of all the ring-shaped members in axial alignment; inserting a silicone bag into the ring-shaped members, said bag having open opposite ends to fixedly mount the ring-shaped members on the outer surface of the bag; placing said stringers on said silicone bag with the convex part of each stringer fitted in, and passing through, a set of axially aligned recesses of the ring-shaped members, to form a framework of the ring-shaped members and the stringers; inserting a laminating jig into the bag to support said framework from within the bag and to form an assembly of the laminating jig, the bag, the ring-shaped members and the stringers; fitting said assembly on a rotatable winding jig; winding a fiber-reinforced prepreg around the outer surface of said assembly by rotating the winding jig, so as to form a layer of the prepreg around said assembly; setting the layer of the prepreg; removing said assembly from the winding jig; removing the laminating jig from the assembly; subjecting the assembly to bagging and curing steps; and removing the bag to obtain the fuselage structure.

The aircraft fuselage structure according to the present invention is a structure integrally formed in the manner described above and in detail hereinafter. As a result, the structure can be fabricated to have a smooth and fair-curve outer surface and to be considerably light weight. Furthermore, it has high strength since the reinforcing fibers are not divided.

According to the method of the present invention of fabricating aircraft fuselage structures as described herein, accurate positioning of the various members and application of uniform pressure on the members are possible. Furthermore, the reinforcing rings, the longitudinal stringers, and the fiber-reinforced prepreg are formed integrally by the resin setting process. For this reason, the work time is shortened and the production cost is lowered.

Preferred embodiments of the present invention will become understood from the following detailed description referring to the accompanying drawings.

DETAILED DESCRIPTION OF THE PREFERRED EMBODIMENTS

Figure 1:
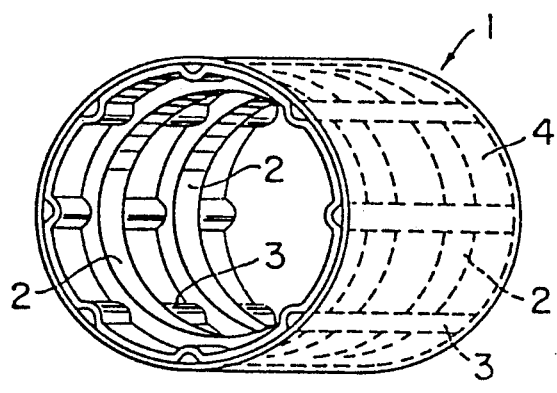
FIG. 1 is a perspective view showing a portion of an aircraft fuselage structure according to the present invention.

FIG. 1 illustrates a portion of an aircraft fuselage structure 1 according to the present invention. The essential elements of the structure 1 are a plurality of transverse reinforcing rings 2, a plurality of longitudinal stringers 3, and a sheathing or outer covering of fiber-reinforced prepreg 4 of tape-form. The rings 2 and the stringers 3 are assembled perpendicularly to each other to form a framework, and the prepreg 4 is wrapped around the framework.

Figure 2:
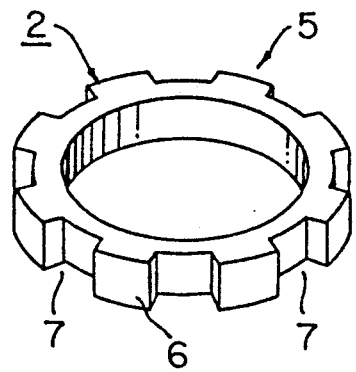
FIG. 2 is a perspective view of a ring-shaped member in the framework of the fuselage structure.

The reinforcing rings 2 are assembled in spaced-apart formation. As shown in FIG. 2, each ring 2 is in the form of an annular member 5. Each annular member 5 is fabricated in the form of a fiber-reinforced laminate. Each member 5 is provided with recesses or grooves 7, 7, . . . at spaced-apart positions around its outer peripheral surface 6.

Figure 3:
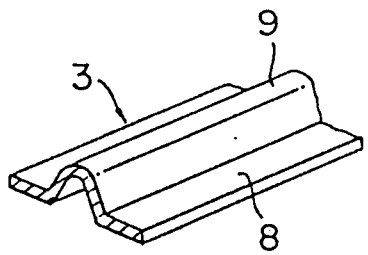
FIG. 3 is a fragmentary perspective view of a longitudinal stringer in the framework.

As shown in FIG. 3, each stringer 3 comprises a plate member 8 and a convex stiffener part 9. The plate member 8 is formed as a fiber-reinforced laminate similarly as the annular member 5. The stiffener part 9 has a convex cross section of the shape of a peaked hat which corresponds to the concave cross section of each groove 7 in the annular member 5 for fitting snugly thereinto. The stiffener part 9 has a hollow interior and extends integrally with the plate member 8 centrally and in parallel thereto.

The fiber-reinforced prepreg 4 of tape-form is formed by drawing together a plurality of filaments to form a fiber tape of narrow width and then impregnating the fiber tape with a resin.

Figure 4A:
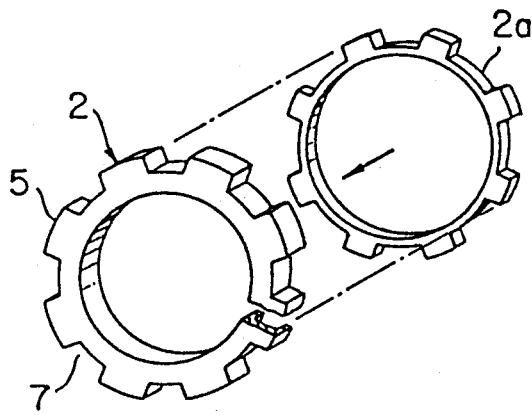
FIGS. 4A through 4G are perspective views, indicating successive steps in the method according to the present invention.
Figure 4B:
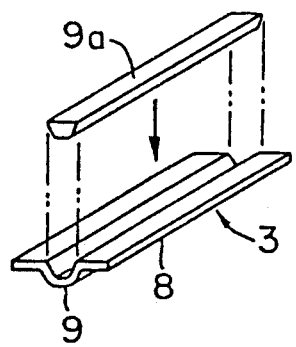

The aircraft fuselage structure according to the present invention is formed in the following manner. First, the rings 2 and the stringers 3 as shown in FIGS. 4A and 4B, respectively, are prepared from fiber-reinforced laminates either by hand laying-up or by an automatic laminating process and by thereafter forming the laminates by means of a suitable molding means. Each ring 2 has a U-shaped cross section as shown so that it has a hollow interior that opens at one side. As shown in FIG. 4A, an annular core 2a of iron, for example, is fitted into the hollow interior of each ring 2. Furthermore, as shown in FIG. 4B, a mandrel 9a of silicone rubber is fitted into the stiffener part 9. The core 2a and the mandrel 9a are used to maintain the shapes of the ring 2 and the stringer 3.

Figure 4C:
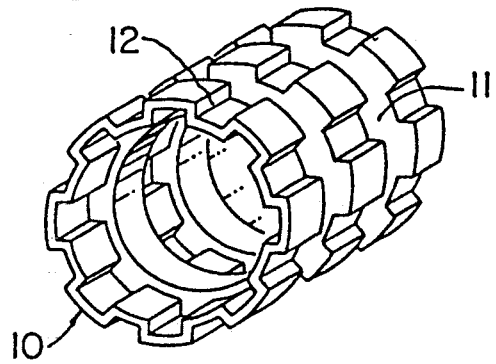

Next, a silicone bag 10 as shown in FIG. 4C is prepared. The bag 10 is formed from silicone rubber, for example. The silicone bag 10 is in the shape of a hollow cylinder with two open ends. The bag 10 is provided, on the outer cylindrical surface thereof at specific space intervals in the axial direction thereof, with annular grooves 11 for accommodating respective rings 2. The silicone bag 10 is also provided on the outer surface thereof with longitudinal grooves 12 extending in parallel to the axis of the bag for accommodating respective stringers 3.

Figure 4D:
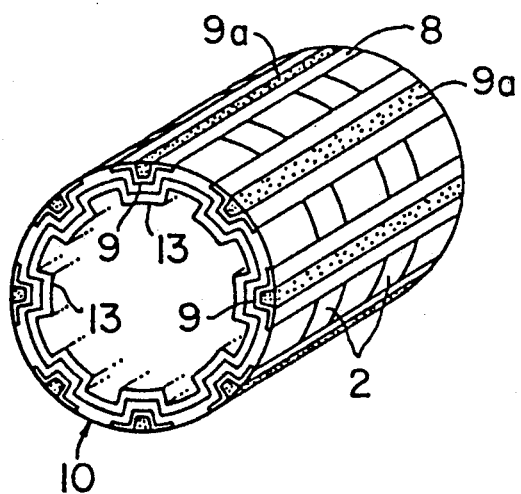

The previously prepared rings 2 of a required plural number are then placed in a row with specific spacing. The silicone bag 10 is then inserted through the rings 2 into place. Then a jig 13 comprising a plurality of arcuate members for laminating the outer sheathing is successively inserted into the silicone bag 10 and assembled so as to form a hollow cylinder against the inner wall surface of the silicone bag 10. Concavities corresponding to the contour of the silicone bag 10 are formed in the jig 13. The rings 2 are fitted over the silicone bag 10 into the concavities as indicated in FIG. 4D. Preferably at this time, the annular cores 9a are fitted simultaneously in the hollow interiors of the rings 2.

After the rings 2 have all been placed on the jig 13 through the bag 10, the stringers 3 with the mandrels 9a fitted therein are placed in the grooves 12 of the bag 10 on the jig 13 from the outside. Thus an assembly of the reinforcing rings 2, the stringers 3, and the jig 13 is formed. In the assembly thus formed, the rings 2 and the stringers 3 are accurately and positively disposed at their respective specific positions.

Figure 4E:
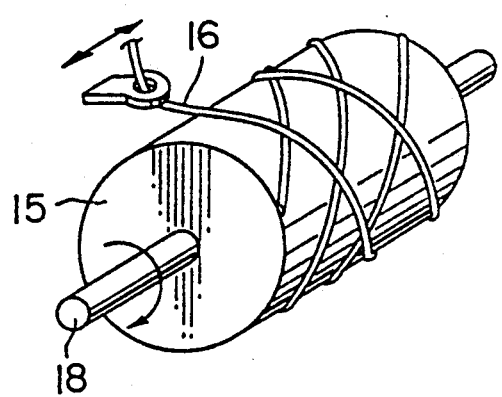

Next, the assembly is fitted on the outer side of a rotatable winding jig 15 as shown in FIG. 4E. The jig 15 is supported by a rotary shaft 18. Then a fiber-reinforced prepreg 16 of tape form is wound around the outer surface of the assembly of the rings 2 and the stringers 3 so as to form a layer around the outer surface of the assembly. The prepreg 16 has been previously prepared by drawing together a plurality of filaments to form a fiber tape of narrow width and then impregnating the fiber tape with a resin. The winding angle (or pitch) and the number of winding plies of the prepreg 16 are determined in accordance with the required strength of the outer sheathing of the fuselage.

Figure 4F:
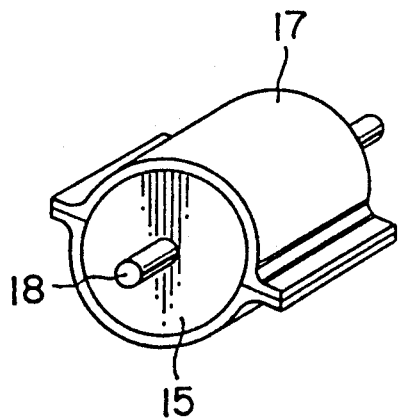
Figure 4G:
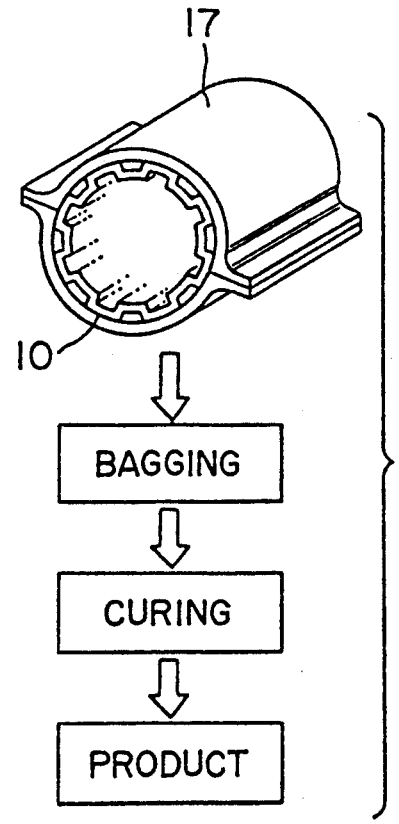

Upon completion of the winding of the prepreg 16 around the assembly of the rings 2 and the stringers 3, a female mold 17 for resin setting is placed around the assembly as shown in FIG. 4F. Then, as indicated in FIG. 4G, the laminating jig 13 and the winding jig 15 are removed. At this time the silicone bag 10 is left on the assembly thereby to prevent displacement of the rings 2 and the stringers 3.

The assembly thus placed in the female mold 17 for resin setting is then subjected to a bagging step and a curing step according to the conventional procedure, as indicated in FIG. 4G. Thus the objective product is obtained. Upon completion of the curing step, the female mold 17 and the silicone bag 10 are removed. The cores 2a and the mandrel 9a are also removed.

Figure 5:
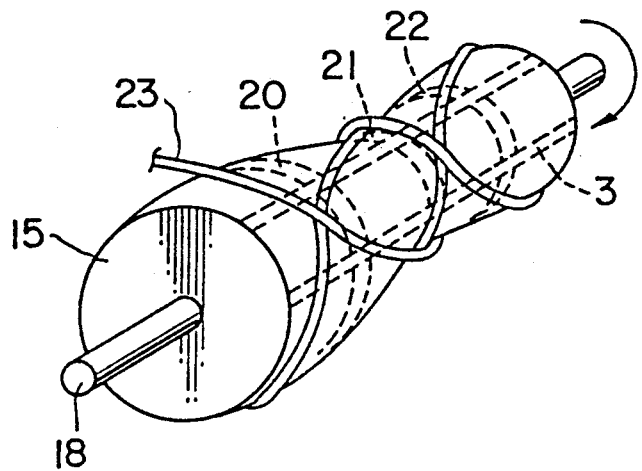
FIGS. 5 and 6 are perspective views respectively showing other embodiments of the aircraft fuselage structure according to the present invention.

Other embodiments of the present invention will now be described with reference to FIGS. 5 and 6. In the embodiment shown in FIG. 5, a plurality of ring-shaped members 20, 21, 22, of respectively different diameters are used in forming a framework with stringers 3. The ring-shaped members 20, 21, 22, are positioned at specific spacing intervals in the longitudinal direction. A fiber-reinforced prepreg 23 is wound spirally around the framework as shown. Thus an outer skin having parts of different diameters is obtained.

Figure 6:
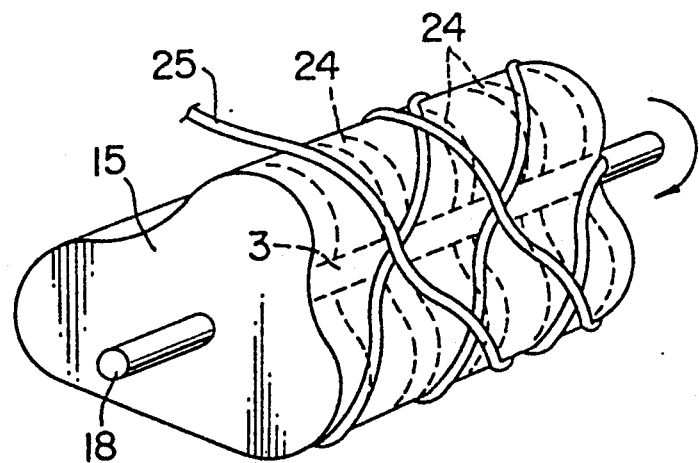

In the embodiment shown in FIG. 6, a plurality of closed-figure members 24, 24, 24, . . . , each having three convex arcuate parts and two convex arcuate parts interposed therebetween are used in forming a framework. The members 24, 24, 24, . . . are positioned at specific spacing intervals in the longitudinal direction. A fiber-reinforced prepreg 25 is wound spirally around the framework as shown. Thus an outer skin of the shape indicated is obtained.

As described above, the present invention provides a fuselage structure of an aircraft with the following meritorious features. A fiber-reinforced prepreg is wound around the outer surface of a framework assembly of reinforcing rings and stringers. The prepreg is then subjected to a setting process thereby to obtain an integrally formed structure. As a result, the structure becomes a product with a smooth and fair-curve outer surfaces and with a greatly reduced weight. Furthermore the reinforcing fibers are not separated. Therefore a product of high strength is obtained.

In addition, the present invention provides a method of fabricating fuselage structures of aircraft as described above. Because of the nature of the method, the following meritorious results are afforded. During the forming process, accurate positioning of the various members and application of uniform pressure thereon are possible. Furthermore, by the setting step, the reinforcing rings, the longitudinal stringers, and the fiber-reinforced prepreg are formed into an integral structure. Therefore the setting time is shortened, and the production cost is lowered.

While the presently preferred embodiments of the present invention have been shown and described, it is to be understood that these disclosure are for the purpose of illustration and that various changes and modifications may be made without departing from the scope of the invention as set forth in the appended claims.

What is claimed is:

1. A method of fabricating an aircraft fuselage structure comprising a plurality of ring-shaped members disposed coaxially and spaced axially from each other with substantially parallel orientation relative to each other, a plurality of stringers extending axially of the ring-shaped members in parallel spaced disposition circumferentially of the ring-shaped members which are U-shaped in cross section and have a hollow interior opening in an axial direction to thereby fixedly connect the ring-shaped members with each other so as to form a framework, thereby preventing deformation thereof during assembling and curing of the fuselage and an outer skin of a prepeg material secured to an outer surface of the framework to cover the same;

said method comprising the steps of:
preparing a plurality of ring-shaped members of a fiber-reinforced laminated material, each provided with a plurality of recesses around the outer peripheral surface thereof at positions spaced apart in the circumferential direction thereof;

preparing a plurality of stringers of a fiber-reinforced laminated material, each consisting of a plate member and a convex part on the plate member, said convex part corresponding in shape to each of said recesses;

arranging said ring-shaped members coaxially at spaced apart dispositions with substantially parallel orientation relative to each other and with the recesses of all the ring-shaped members in axial alignment;

inserting into the ring-shaped members a silicone bag having open opposite ends and annular and longitudinal grooves which accommodate the ring-shaped members and the stringers to fixedly mount the ring-shaped members on the outer surface of the bag;

placing said stringers on said silicone bag with the convex part of each stringer fitted in, and passing through, a set of axially aligned recesses of the ring-shaped members, to form a framework of the ring-shaped members and the stringers;

inserting a laminating jig into the bag to support said framework from within the bag and to form an assembly of the laminating jig, the bag, the ring-shaped members and the stringers;

fitting said assembly on a rotatable winding jig;

winding a fiber-reinforced prepeg around the outer surface of said assembly by rotating the winding jig, so as to form a layer of the prepeg around said assembly;

setting the layer of the prepeg;

removing said assembly from the winding jig;

removing the laminating jig from the assembly;

subjecting the assembly to bagging and curing steps; and removing the bag to obtain the fuselage structure.

2. The method according to claim 1, further comprising the steps of:
providing said bag with circumferential annular grooves spaced apart axially of the bag and with longitudinal grooves extending axially of the bag and spaced apart circumferentially of the bag;
fitting said ring-shaped members into respective said annular grooves; and
fitting said stringers into respective said longitudinal grooves.

3. The method according to claim 1, wherein
said laminating jig comprises a plurality of arcuate members capable of being assembled to form the jig.

4. The method according to claim 1, further comprising the steps of:

placing a female mold around said assembly to carry out said setting of the layer of the prepreg; and removing the female mold with the step of removing the bag.

5. The method according to claim 1, further comprising the steps of:

inserting an annular core into each of the ring-shaped members when the ring-shaped members are arranged at said spaced apart dispositions; and removing the annular core after the curing.

6. The method according to claim 1, further comprising the steps of:

inserting a mandrel into the convex part of each of the stringers when the stringers are placed onto the silicone bag; and removing the mandrel after the curing.

* * * * *